United States Patent [19]

Conanan

[11] Patent Number: 5,212,551
[45] Date of Patent: May 18, 1993

[54] METHOD AND APPARATUS FOR ADAPTIVELY SUPERIMPOSING BURSTS OF TEXTS OVER AUDIO SIGNALS AND DECODER THEREOF

[76] Inventor: Virgilio D. Conanan, 475 Graphic Blvd., New Milford, N.J. 07646

[21] Appl. No.: 425,687

[22] Filed: Oct. 16, 1989

[51] Int. Cl.$^5$ .................................................. H04N 7/08
[52] U.S. Cl. .................................... 358/143; 358/142
[58] Field of Search ............... 358/147, 142, 143, 198

[56] References Cited

PUBLICATIONS

S. Crowley, "Bringing Radio Up to Date", The Washington Post D3 Jun. 1990.

Primary Examiner—James J. Groody
Assistant Examiner—David E. Harvey

[57] ABSTRACT

An apparatus is disclosed for adaptively superimposing bursts of text over audio signals comprising an encoder and a decoder wherein said encoder comprises means for separating unencoded audio signals into discrete passbands; means for measuring power levels contained in each discrete passband; a time delay; a plurality of power level comparators; means for generating concatenated bursts of digital header, digital text and digital footer signals; a frequency modulator; a modulator output power adjusting means; means for combining time delayed unencoded audio signals with modulator output level; and, means for transmitting or recording resultant encoded sound signals; wherein said decoder comprise means for separating received encoded sound into discrete passbands; an FM demodulator; a text separator; a television modulator; and sound reproduction means.

14 Claims, 3 Drawing Sheets

METHOD AND APPARATUS FOR ADAPTIVELY SUPERIMPOSING BURSTS OF TEXTS OVER AUDIO SIGNALS AND DECODER THEREOF

FIELD OF THE INVENTION

The present invention generally pertains to electronic telecommunication systems and, more particularly is concerned with one-way communications systems employing adaptive superimposition of digital data over analog sound signals.

BACKGROUND OF THE INVENTION

Sound programming is currently being distributed both for commercial and consumer applications in radio, television, cinematography and magnetic media. Prior art accomplish simultaneous transmission of digital text with analog sound in several ways: by means of providing a separate, independent digital sound channel in the same medium; by means of encoding digital data with the visual portion of analog television signals; by means of first digitizing the original analog sound and then by multiplexing or statistically coding additional digital data with said digitized sound sources; and, by means of first digitizing a portion of the original analog video signal and then by multiplexing or statistically coding additional digital text. Examples of such systems are described in U.S. Pat. No. 4,780,758.

A number of more specific prior art approach have been suggested and implemented, such as what is generically called Videotex, which is a digital text service employed in television that provides weather reports, news, stock market reports, theater and restaurant listings, advertisements, mailbox services, paging services and also allows access to various databases. In Videotex, the text is displayed either in color or in black-and-white on modified home TV receivers. "Teletext" is a subset of Videotex which describes variations of one-way-only services that connect information centers and their computers to provide electronic data files to users. At least one available line of the broadcast television vertical blanking interval (retrace) signal is used. "Videotex" is another subset of Videotex which refers to interactive systems typically using telephone lines or broadband coaxial cable distribution systems that are capable of sending data bi-directionally.

It has been discovered that: the statistical time-averaged sound spectrum of voice and musical instruments occupy only a small portion of its allocated bandwidth; human hearing has different thresholds of perceptibility for certain sound acoustical characteristics; the psychoacoustic character of sound such as pitch, loudness, timbre, duration, growth and decay, consonance, rhythm, presence and vibrato can be electrically manipulated without significantly altering the original sound's overall psychoacoustical character; human hearing is less sensitive to noise-like signals; high-frequency noise is masked by coherent sounds of definite pitch and higher levels; the dynamic characteristics of sound depend principally upon the loudness; the temporal characteristics involve time, duration, tempo and rhythm; the qualitative characteristics of sound involve timbre, or the harmonic constitution of the tone; a non-coherent, wideband, noise-like burst of data carrier signal is less likely to affect the overall tonal quality of the original sound; the tonal characteristics of sound involve pitch, timbre, melody, harmony, and all forms of pitch variants; the upper limit of pitch, a sensory characteristic arising out of the frequency assigned to a tone, as perceived by an average individual under forty years of age, with good hearing, unimpaired by disease or injury is around 15 KHz; in another psychoacoustic characteristic called pitch discrimination, which is one's ability to differentiate the pitch between two sounding tones, one can not discriminate the presence of a 15 KHz tone that is sounded simultaneously with another tone of lower frequency and lower in level by at least ten decibels; and, another psychoacoustic characteristic called Duration of Sound which is related to pitch discrimination indicates that a tone of certain amplitude in the presence of another tone with a different amplitude must persist for a certain length of time in order to detect a change in pitch—if the duration of the tone is very short, then it appears as a click—if somewhat longer, then it appears as noise with some attribute of pitch—as the length of sounding time is increased, it finally becomes a tone of definite pitch—at high frequencies, it takes greater than 1 milliSeconds to ascribe a definite pitch.

The fundamental problems with the prior art approach in Radio, Television, Cinematography and magnetic media for text transmission are: the unavailability of additional sound channels, the inflexibility of broadcast frequency assignments; inefficient methods of modulation; and, the limited number of frequencies that are applicable in the existing equipment infrastructure. Additionally, prior art encoding and decoding methods are complex, expensive, and often require extensive modifications or a complete replacement of existing equipment. For the said reasons, there exists a need for new methods of telecommunications, particularly for transmission of digital text over analog sound that is capable of operating compatibly with existing apparatus for both commercial and consumer use.

The present invention eliminates the problems and disadvantages of prior art approaches.

SUMMARY AND SOME OBJECTS OF THE INVENTION

According to the method of the present invention, digital text can be adaptively superimposed over analog sound signals by exploiting certain psycho-acoustical discoveries for electrically manipulating the sound signal, while keeping intact the original psycho-acoustical character of the original sound signal. The present invention generally includes an encoder system and a decoder system.

Encoding is accomplished by entering into the system an unencoded original sound input signal containing voice, music and other sounds within the human hearing range, and distributing the said input signals to a plurality of paths. The text signal to be conveyed enters the system by means of a text buffer. All functions by the encoder are synchronized by a timing clock generator. The first portion of said input is coupled to a time delay means; the second portion of said input is coupled to a first means for sampling and measuring the sound power at the upper audio passband; the third portion of said input is coupled to a second means for sampling and measuring the sound power at the lower audio passband. A substantially narrowband filter having a bandwidth of 2 KHz and a center frequency of 15 kHz is preferably used for said first sampling and measuring means because it has been discovered that statistically, the time-averaged sound spectrum density at 15 KHz is comparatively less than the density at the lower audio passband. A substantially wider filter having a bandwidth of 10 kHz and having a center frequency at 5 kHz is preferably used for said second sampling and measuring means because it has been discovered that the time-averaged sound spectrum of voice and musical instruments occupy only a small portion of its allocated bandwidth and statistically confined to the lower frequencies of the human hearing range.

A first comparator compares the measured narrow-band signal with a first reference and produces a logical control signal output when the measured signal is greater than the said reference. A second comparator compares the measured wideband signal with a second reference and produces a logical control signal output when the measured signal is greater than the said reference.

A logical arrangement of binary AND gates senses the output of each said comparators and produces a logical control signal output for triggering the retrieval of a burst of text from said data buffer, and for triggering the said concatenation of internally-generated digital header and footer signals with the desired text to be conveyed. The said concatenated sequence of header, text and footer digital signals frequency modulates a local oscillator. The preferred local oscillator frequency is 15 KHz because human hearing is less sensitive to high-frequency signals; and, high-frequency signals are masked by coherent sounds of definite pitch of higher levels. The preferred means of modulation is frequency modulation because this type of modulation yields a dispersed spectrum that resembles the noise spectrum, which is exploited concurrently with the discoveries that human hearing is less sensitive to noise-like signals, and that high-frequency noise is masked by coherent sounds of definite pitch at lower frequencies, and higher levels.

The resulting frequency-modulated burst of concatenated signal is filtered then routed to an adaptive attenuator wherein the output level of said burst of frequency-modulated signal is maintained at ten decibels below the signal level of the said measured wideband signal level. A low level burst of data signal is employed by the present invention in order to exploit a discovery that the duration of a certain sound within human hearing range must persist longer than one millisecond in order to become detectable. A power level difference of ten decibel is employed by the present invention in order to exploit another discovery that one's ability to differentiate the pitch between two sounding tones, called pitch discrimination, is dependent upon the level difference between the two sounding tones. Hence, the resulting non-coherent, noise-like burst of data carrier signal is less likely to affect the overall tonal quality of the original sound when inserted simultaneously with another sound of lower frequency and lower in level by at least ten decibels.

The time delayed input signal and the said attenuated signal are combined and then coupled to subsequent transmission or recording apparatus.

The signal which has been encoded in accordance with the present invention can be transmitted by radio and television, can be recorded by various magnetic media, and can be directly reproduced by prior art sound transducers.

Decoding is accomplished by: entering an input sound signal including original unencoded program source materials and signals which have been encoded according to the present invention; filtering the sound energy fount at a substantially narrow band of the upper bandpass by means of a narrow bandpass filter, for example having a center frequency of 15 KHz and a bandwidth of 2 KHz; amplifying, amplitude-limiting, demodulating and separating the desired text from the recovered signal; and, converting said digital text into standard baseband video for subsequent display by video monitors or television receivers concurrently with the reproduced sound signal.

Both the encoder and decoder can be implemented in either analog domain or digital domain; may be applied in radio, television, cinematography and other magnetic media; and applicable to NTSC, PAL or SECAM television standards. The original sound can be played concurrently with the displayed text, which creates opportunities for new educational, commercial and entertainment consumer services: for example, radio, television, cinematography and prerecorded sound media services may utilize the present invention for the transmission of lyrics with musical sound, for home sing-along use, commercial broadcasting teleprompter applications, for closed captioning for the hearing impaired, and for the transmission of digital control signals including those defined by Musical Instruments Digital Interface (MIDI) protocol, thereby enabling consumers to read text from their Television receivers and sing-along with the music. The conveyed digital text may contain additional control signals for a variety of commercial and consumer control applications.

Accordingly, it is a general object of the present invention to provide an improved and useful communication system which exploits certain psycho-acoustical discoveries for adaptively superimposing digital data over existing analog sound signals in manners that permit existing transmission, reproduction and recording apparatus to process both encoded and unencoded sound without producing perceptible differences in sound quality between the original program and the encoded program.

Another object of the present invention is to provide an improved and useful communication system for adaptively superimposing digital data over the existing sound signals for the purpose of significantly reducing the complexity of the circuitry required to transmit textual information simultaneously with analog sound in order to enable the implementation of lower cost text encoders and corresponding decoders and allows a variety of commercial and consumer services.

These and other objects, advantages and other features will become apparent to those who are skilled in the art from a consideration of the preferred embodiments summarized herein and presented in conjunction with the accompanying drawings.

DETAILED DESCRIPTION OF PREFERRED EMBODIMENTS

The preferred embodiments in accordance with the principles of the present invention includes an encoder and a decoder which will now be described.

FIRST EMBODIMENT

Figure 1:
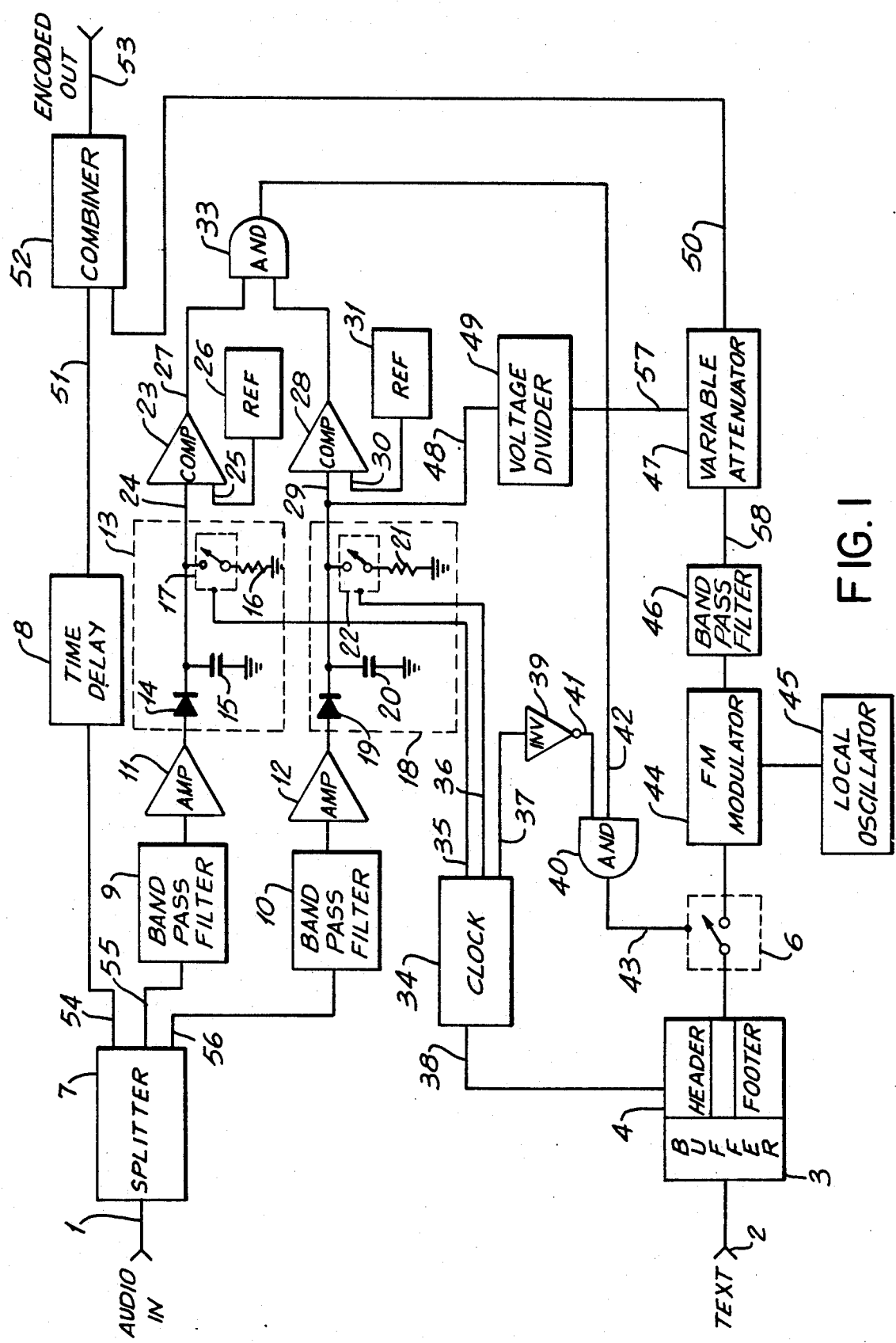
FIG. 1 is a block diagram of a first embodiment of a simple encoder in accordance with the principles of the present invention.
Figure 3:
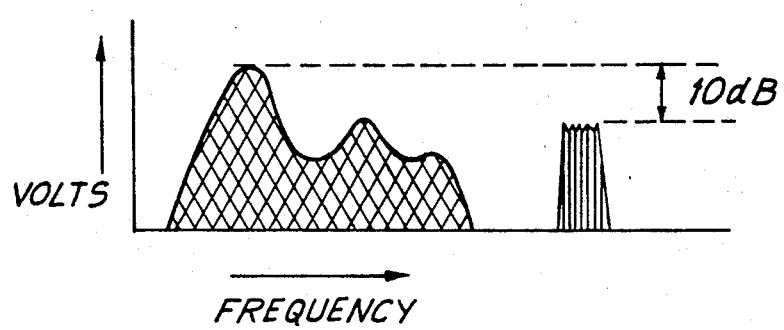
FIG. 3 is an example of the sound spectrum in the frequency domain after superimposition of text.

The first embodiment in accordance with the principles of the present invention, is an encoder as shown in FIG. 1, which include: an original unencoded sound input signal entering the system by a first connector means 1; a digital text signal source of predetermined format and bit rate, entering the system by a second connector means 2; a text buffer 3; a text header signal generator 4; a text footer signal generator 5; a text buffer gating means 6; a 3-way audio signal splitter 7; a time delay means 8; a first bandpass filter 9; a second bandpass filter 10; a first linear amplifier 11; a second linear amplifier 12; a first peak detector and sample-and-hold arrangement 13; a first diode detector 14, a first capacitor 15; a first discharging resistor 16; a first switching means 17; a second peak detector and sample-and-hold arrangement 18 further including a second diode detector 19; a second capacitor 20; a second discharging resistor 21; a second switching means 22; a first comparator 23 having a first voltage reference 26; a second comparator 28 having a second voltage reference 31; a first 2-input AND gate 33; a clock timing synchronization generator 34; a logical inventor 39; a second 2-input AND gate 40; a Frequency-Modulator 44; a local oscillator 45; a third bandpass filter 46; a variable attenuator means 47; a voltage divider means 49; a 2-way signal combiner 52; and, an encoded sound output made accessible by a third connector means 53, herein said encoded output having a frequency domain representation depicted in FIG. 3.

Figure 2:
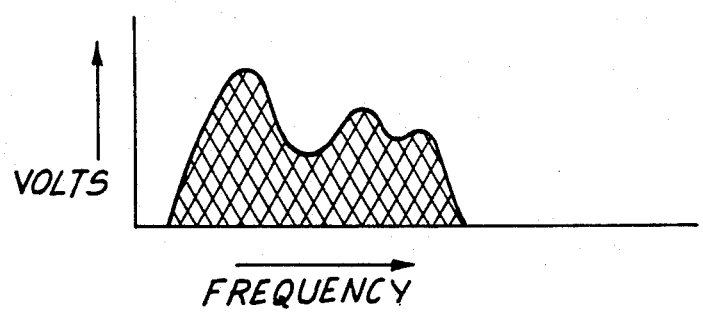
FIG. 2 is an example of the sound spectrum in the frequency domain before superimposition of text.

Original audio signals to be encoded as depicted in FIG. 2 enter the system by a first connector means 1 and a 3-way signal splitter 7 wherein the said input is diverted into three paths; the first path 54 leads to a time delay means 8 having an output 51 coupled to a first input of a 2-way signal combiner 52; the second path 55 leads to a first succession of first bandpass filter 9, first linear amplifier 10, first peak detector-sample/hold arrangement 13; and, the third path 56 leads to a second succession of second bandpass filter 10, second linear amplifier 12, second peak detector-sample/hold arrangement 18.

Figure 4A:
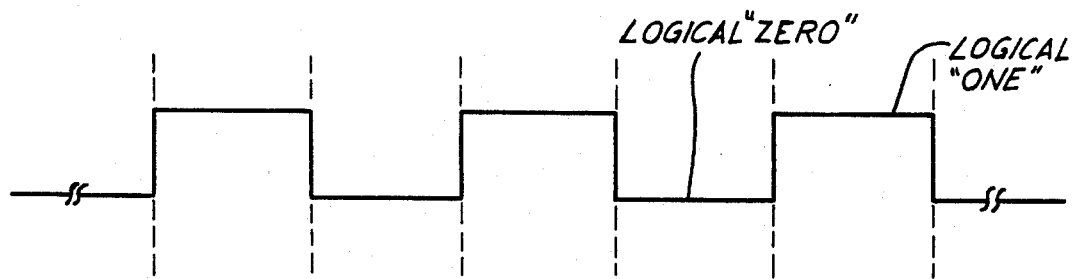
FIGS. 4A and 4B are transition and timing diagrams depicting the encoding sequence of operation of the various elements of the present invention; and, FIG. 5 is a block diagram of a second embodiment of a simple decoder in accordance with the principles of the present invention.
Figure 4B:
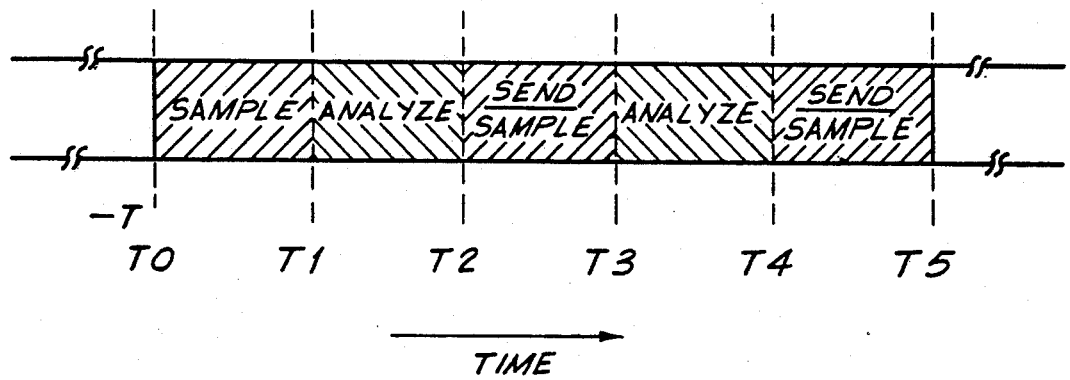

Referring now to FIG. 4, waveform A depicts the series of clock synchronizing pulses alternating from a logical "zero" state to a logical "one" state at predetermined intervals. On waveform B, time −T depicts the time prior to operation; time T0 to T1 depicts the first sampling interval; T1 to T2 and T3 to T4 depicts the time required for analyzing the results of the preceding sampling processes; T2 to T3 depicts the second sampling interval and also the time for sending a burst of digital text concurrently with the delayed input signal; T4 to T5 depicts the second sampling and sending time intervals; and, from T5 and thereafter, depicts a repetition of the preceding sampling-analyzing-sending time intervals.

Referring to FIG. 4 and FIG. 1, at −T, which is the time prior to the first sampling period: the original unencoded sound input signals as derived from a direct sound source or previously-recorded materials represented in the frequency domain as in FIG. 2 enters the encoding system by a first connector means 1; said first switch 17 and said second switch 22 are closed, and both first capacitor 15 and second capacitor 20 are discharged by first discharge resistor 16 and second discharge resistor 21 respectively; hence, the said first peak detector-sample/hold 13 output 24 yields a zero DC component, and the said second peak detector-sample/hold 18 output 29 also yields a zero DC component; a digital text signal source of predetermined format and bit rate enters the system by a connector means 2, and a portion of the text is loaded in the said text buffer 3; third switch 6 is open; and, no sound is available at the output 53.

At time T0, the first sampling interval begins when a logical "one" signal appears from the timing generator output. Both first switch 17 and second switch 22 open; first bandpass filter 9 and second bandpass filters 10 each allow sound energy into their respective passbands; first amplifier 11 and second amplifier 12 amplify the respective input signals respectively coupled to first peak detector-sample/hold 13 and second peak detector-sample/hold 18; respective first capacitor 15 and second capacitor 20 consequently begin accumulating charge. Between T0 and T1, said first peak detector-sample/hold 13 output 24 yields a positive DC component that is equivalent to the sound power contained in the first said bandpass filter 9 having for example a center frequency of 15 KHz and a bandwidth of 2 KHz; the said second peak detector-sample/hold 18 output 29 yields a positive DC component equivalent to the sound energy contained in the said second bandpass filter 10 having for example, a center frequency of 5 kHz and a bandwidth of 10 kHz.

At the end of the first sampling interval at time T1, the analyzing interval begins as the first comparator 23 compares the first sampled/hold 13 output 24 and produces a logical "one" output at 27 when said first sample-and-hold output voltage at 24 is lower than said first reference 25,26 and produces logical "zero" output when said first sample-and-hold output voltage at 24 is higher than said first reference 25,26; said second comparator 28 compares second sampled/hold 18 output 29 and produces a logical "one" output when said second sample-and-hold 13 output 29 voltage is lower than said second reference 30,31, and produces a logical "zero" output when said second sample-and-hold 18 output 29 voltage is higher than said second reference 30,31 said first 2-input AND gate 33 produces a logical "one" output at 42 whenever said first comparator 23 and said second comparator 28 have both logical "ones" at their respective outputs 27,32; a second 2-input AND gate 40 produces a logical "one" output when said first AND gate 33 output 42 and inverter 39 output 41 have both logical "one." Both first reference 26 and second reference 31 are adjustable preferable to compensate for system noise.

Approaching time T2, responsive to said second AND gate 40, said third switch 6 closes whenever a logical "one" appears at 43 and triggers: the means for generating a predetermined length of digital header signals by the header generator 4; the means for generating a predetermined length of digital footer signals by the footer generator 5; and the concatenation and serial extraction of digital text signals from the text buffer 3. Said concatenated digital text signal modulates said frequency-modulator 44 through third switch 6 and generates a dispersed, noise-like modulated signal which is centered at predetermined local oscillator 45 frequency, variably and preferably set 15 KHz. A third bandpass filter 46 of predetermined center frequency, variably and preferably set at 15 KHz, having a predetermined bandwidth variably and preferably set at 2 KHz, removes undesired signals beyond said third filter 46 bandwidth. Voltage divider means 49 produces an output control signal that is proportional to said second sample-and-hold 18 output 29 voltage. Responsive to voltage divider 49 output 57, variable attenuator 47 adjusts said modulated and filtered digital text signal 58 emanating from said third filter 46 in order to consistently maintain the attenuated signal 50 level at least ten decibels below that of the measured sound energy level as determined by previous sampling, detecting and measuring steps performed by said second bandpass filter 10, second amplifier 12 and sample-and-hold 18.

Still at time T1 to T2, FIG. 4, when said sampling, measuring and comparing means result in logical "zero" output at said second AND gate, which indicate that insertion of text is not possible: said third switch remains open; the text buffer retains its stored data; said first switch closes; said second switch closes; first capacitor 15 and second capacitor 20 both discharges by means of first discharging resistor 16 and second discharging resistor 21 respectively; and, both first sample/hold 13 output 24 and second sample/hold 18 output 29 are initialized to a zero volts state.

At time T2, FIG. 4, when said sampling, measuring and comparing means result in logical "one" output at said second AND gate, which indicate that insertion of text is possible: the output 50 from said variable attenuator 47 is coupled to a first input of a 2-input signal combiner 52, and the time delayed signal 51 from said time delay means 8 is coupled to a second input 51 of said signal combiner 52, thereby yielding an output 53 that contains both the delayed original sound with an adaptively superimposed burst of digital text as depicted in FIG. 2. Said time delay means 8 is capable of delaying said sound input by a time period equivalent to time T0 to T1 in FIG. 4.

At time T2 to T3, FIG. 4, the second sampling period begins at the same time that textual data is being transmitted. During time T4, the results of the second sampling interval is analyzed, and, responsive to said comparing and triggering means, for subsequent transmission during time T4 to T5. At time T5 and thereafter, the entire sampling, analyzing and sending steps are repeated.

SECOND EMBODIMENT

Figure 5:
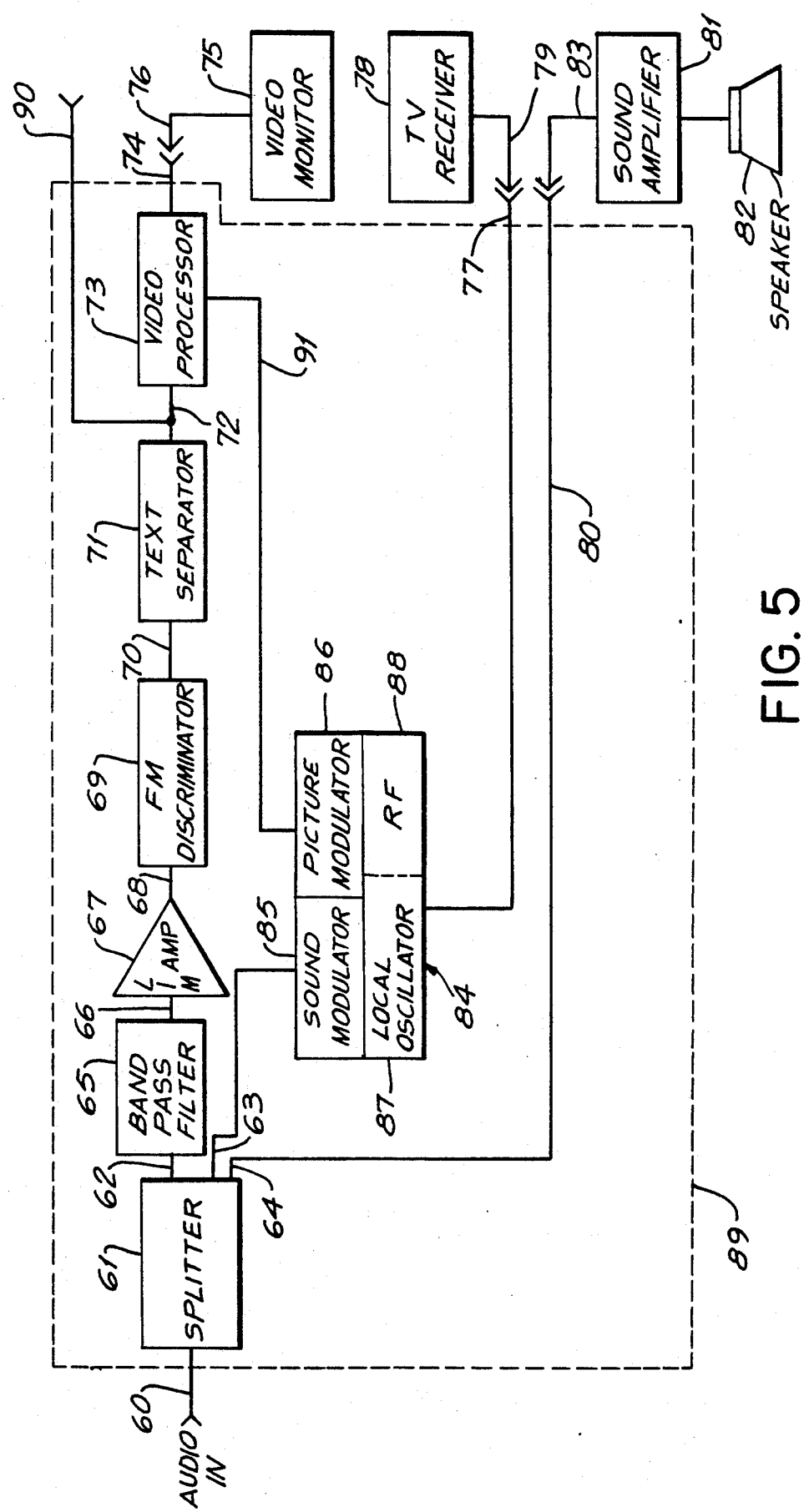

The second embodiment shown in FIG. 5 is a simple decoder which is in accordance with the principles of the present invention, comprising: an input connector 60 for signals derived either from an original unencoded program source material or a signal which is encoded according to the present invention; a 3-way signal splitter 61; a bandpass filter 65; a limiting audio amplifier 67; a frequency discriminator means 69; a text signal separator 71; a data connector 90; a text-to-video processor 73; baseband video connector 74; a video monitor 75; a television modulator 84 for NTSC, PAL or SECAM television standards; an RF output connector 77; a baseband audio connector 80; a television receiver 78; and, a peripheral sound amplifier 81 having a suitable transducers 82; The entire decoder apparatus is contained in a suitable housing 89 which can easily interface with existing television display and sound reproducing apparatus.

Still referring to FIG. 5, input signals including original unencoded sound signals and encoded signals which are in accordance with the present invention enter the system through an input connector 60 which is coupled to a 3-way signal splitter 61, wherein said input signals are diverted into three paths 62,63,64; the first path 62 is coupled to a bandpass filter 65 having a predetermined center frequency, preferably 15 KHz, a predetermined bandwidth of preferably 2 KHz and having electrical characteristics that are equivalent to the characteristics of said first filter 9, FIG. 1, of the aforementioned first encoder which is in accordance with the first embodiment of the present invention. A limiting audio amplifier 67 is coupled to the output 66 of the said bandpass filter 65 to simultaneously amplify the input signal with a predetermined amplification factor and remove input signal amplitude variations. A frequency discriminator 69 is coupled to said limiting amplifier 67 output 68 to extract the modulating digital baseband signal from the carrier at 15 KHz. A text separator 71 removes said digital header signals and said digital footer signals from the entire digital signal string, thereby yielding at outputs 72,90 only the desired transmitted data. Said extracted data at 72 is made available to other peripheral digital apparatus by means of data connector 90 and coupled to a text-to-video processor 73 wherein the desired digital text data is converted into a form suitable for driving television display devices. A baseband video connector 76 allows an external video monitor 75 having a baseband video connector 76 to display the desired text on the said television screen. A second video output 91 of said video processor 73 is coupled to the video section 86 of an internal television modulator 84 which may be in either NTSC, PAL or SECAM television standards.

A second output 63 of said input signal splitter 61 drives the sound section 85 of said television modulator 84 having a local oscillator 87 frequency corresponding with predetermined standard worldwide frequency channelization plans, preferably channel 2 or channel 3 as defined by the Federal Communications Commission in the United States. The resulting Radio Frequency signals at 88 is coupled to an RF output connector 77 for driving television receivers 78 capable of operating in NTSC, PAL or SECAM television standards, and having a corresponding RF input connector 79.

A third output 64 of said input signal splitter 61 is coupled to a baseband audio connector 80 and allows the said sound input, which may be in the original unencoded form or encoded according to the present invention to be reproduced concurrently with the text displayed by said television apparatus 75,78 by means of a peripheral audio amplifier 81 and transducers 82 having a corresponding audio connector 83.

The present invention allows transmission of text in Radio, Television, Cinematography and other magnetic media. Both first embodiment and second embodiment may be implemented either in analog form or in digital form.

What is claimed is:

1. An apparatus for adaptively superimposing bursts of digital data with analog sound signals, comprising an encoder and decoder, wherein said encoder comprise:
   means for entering original, unencoded audio program input signals;

means for dividing said unencoded audio program input signals into three portions;

means for time delaying a first portion of said unencoded input signals;

a variable high-pass filter means for generating an upper passband of said unencoded input signals;

a variable low-pass filter means for generating a lower passband of said unencoded input signals;

means for generating clock timing synchronization pulses;

means for measuring a first sound power level found at a predetermined narrow bandwidth of said upper baseband of second portion of said unencoded input signal;

means for measuring a second sound power level found at a predetermined bandwidth of said lower passband of third portion of said unencoded input signal;

means for measuring a plurality of power levels of said unencoded sound signals at a plurality of frequencies and at a plurality of bandwidths;

means for comparing said measured first power level with a predetermined first reference signal and subsequently generating first binary control signals therefrom;

means for comparing said measured second power level with a predetermined second reference signal and subsequently generating second binary control signals therefrom;

means for logically comparing said first binary control signals with said second binary control signals and subsequently triggering the generation of bursts of concatenated digital header signals, digital text signals, and digital footer signals therefrom;

means for modulating a frequency-modulator with said bursts of concatenated digital header signals, digital text signals, and digital footer signals;

means for bandlimiting said frequency-modulated signal resulting from said modulation means;

means for adaptively adjusting the output power level of said bandlimited frequency-modulated signal;

means for transmitting or recording said encoded signals;

wherein, said decoder comprise:

means for receiving said transmitted encoded signals;

means for dividing said received input signals into three portions;

means for bandlimiting the first portion of said received divided input signals;

means for amplifying and amplitude-limiting said bandlimited first portion of received input signals;

means for demodulating said amplified and amplitude-limited signal;

means for separating desired digital text from said demodulated digital signals;

means for converting said desired digital text into baseband video signals;

means for modulating the picture and sound carriers of a standard television modulator with said converted baseband video signals; and, displaying said video signals containing said desired text concurrently with the received reproduced input sound signals using television reproduction means;

thereby allowing adaptive conveyance of text information with analog sound signals.

2. The apparatus for adaptively superimposing bursts of digital data with analog sound signals as recited in claim 1, wherein said time delay means comprise a programmable arrangement of digital shift registers capable of adjusting a time delay.

3. The apparatus for adaptively superimposing bursts of digital data with analog sound signals as recited in claim 1, wherein said encoder further comprises:

a 3-way audio signal splitter having an input connected to a source of original, unencoded audio program input signals and having three outputs;

a first bandpass filter having a variable center frequency and said filter having a variable bandwidth and having an input coupled to first output of said signal splitter;

a first linear amplifier having an input coupled to output of said first bandpass filter;

a first peak detector having an input coupled to output of said first linear amplifier;

a first sample-and-hold having an input coupled to said first peak detector;

a second bandpass filter having a variable center frequency and having a variable bandwidth and having an input coupled to second output of said signal splitter;

a second linear amplifier having an input coupled to output of said second bandpass filter;

a second peak detector having an input coupled to output of said second linear amplifier;

a second sample-and-hold having an input coupled to output of said second peak detector;

wherein said first and second level measuring means produce analog positive DC components corresponding with the power level of the sound contained in frequency band of said first bandpass filter and the power level of the sound contained in frequency band of said second bandpass filter.

4. The apparatus for adaptively superimposing burst of digital data with analog sound signals as recited in claim 1, wherein said encoder further comprises:

a first analog comparator having an input coupled to first analog positive DC component and having a second input coupled to a first adjustable voltage reference;

a second analog comparator having an input coupled to second analog positive DC component and having a second input coupled to a second adjustable voltage reference;

a first dual-input AND gate having a first input coupled to output of said first analog comparator, and having a second input coupled to output of said second analog comparator;

a clock timing synchronization generator having a plurality of outputs coupled to a logical inverter, a first and second sample-and-hold, and a digital text buffer;

a logical inverter having an input coupled to said clock generator;

a second dual-input AND gate having a first input coupled to output of said first AND GATE, and having a second input coupled to output of said logical inverter;

wherein output of said second AND gate is coupled to a triggering means.

5. The encoder of an apparatus for adaptively superimposing bursts of digital data with existing analog sound signals as recited in claim 1, wherein said modulating means include a frequency and having a variable modulation index.

6. The encoder of an apparatus for adaptively superimposing bursts of digital data with existing analog sound signals as recited in claim 1, wherein said modulator output power level adjustment means include a voltage divider and means for maintaining the difference in power level between the modulator output power level and the power level of the original unencoded input signals at 10 decibels or greater;
    wherein the absolute power level is maintained 10 decibels lower than the peak power level of the original unencoded input signal.

7. The encoder of an apparatus for adaptively superimposing bursts of digital data with existing analog sound signals as recited in claim 1, wherein each said burst of concatenated digital header signals, digital text signals, and digital footer signals is transmitted in less than one millisecond.

8. The apparatus for adaptively superimposing bursts of digital data with existing analog sound signals as recited in claim 1, wherein said decoder for receiving said transmitting or recorded encoded signal comprises:
    an audio input connector coupled to a source of transmitted or recorded encoded signals;
    a three-way signal divider having an input connected to said audio input connector and having three outputs;
    as bandpass filter having an input coupled to a first output of said signal divider;
    a limiting audio amplifier having an input connected to output of said bandpass filter;
    a frequency discriminator having an input connected to output of said limiting audio amplifier;
    a text signal separator having an input connected to output of said frequency discriminator;
    a data output connector coupled to output of said text signal separator and having two outputs;
    a text-to-video converter having an input connected to said text signal separator;
    a baseband video connector coupled to said text-to-video converter;
    a video monitor coupled to said baseband video connector;
    a television modulator having an audio section whose input is coupled to the second output of said 3-way signal divider, a video section whose input is coupled to a second output of said text-to-video converter, an RF section and the corresponding standard local oscillator;
    an RF output connector that is coupled to RF section of said television modulator;
    a baseband audio output connector that is coupled to a third output of said 3-way signal divider;
    a television receiver coupled to said RF output connector;
    a peripheral sound amplifier coupled to said baseband audio output connect having transducers; and, a housing.

9. The apparatus for adaptively superimposing burst of digital data as recited in claim 8, wherein said television modulator, video monitor, and television receiver are capable of receiving, processing and displaying television signals.

10. The apparatus for adaptively superimposing bursts of digital data with existing analog sound signals as recited in claim 1, wherein decoder baseband video signals containing recovered desired text are displayed on a television screen concurrently with the reproduced sound.

11. A system for conveying digital text with existing analog sound signals, comprising an encoder and decoder, wherein said encoder comprises:
    means for entering an original, unencoded audio program input signal;
    time delay means;
    means for generating a plurality of discrete passbands;
    means for measuring specific power levels contained in said discrete passbands;
    means for comparing said measured power levels with reference power levels and subsequently generating control signals responsive to said comparing means;
    means for generating a bursts of concatenated digital header signals, digital text signals, and digital footer signals responsive to said comparing means;
    means for modulating a frequency-modulator with said bursts of concatenated digital signals;
    means for bandlimiting the frequency-modulated signals;
    means for adaptively adjusting the power level of said frequency-modulated signals;
    means for combining said adaptively power-adjusted signals with time delayed unencoded input signals;
    means for transmitting or recording said combined signals;
    wherein, said decoder comprises means for receiving said transmitted combined signals;
    means for generating a plurality of discrete passbands of said received signals;
    means for measuring specific power levels contained in said discrete passbands of said received signals;
    means for demodulating frequency-modulated signals found in passbands of said received signals;
    means for converting demodulated digital text into baseband video signals;
    means for modulating television modulators;
    television reproduction means; and,
    sound reproduction means;
    thereby allowing adaptive conveyance of text information with analog sound signals.

12. The encoder of an apparatus for adaptively superimposing bursts of digital data with existing analog sound signals as recited in claim 11, wherein said means for measuring power levels at a plurality of predetermined frequencies and plurality of predetermined bandwidths is digitally implemented by means of a programmable microprocessor.

13. The encoder of an apparatus for adaptively superimposing bursts of digital data with existing analog sound signals as recited in claim 11, wherein said means for comparing the power levels said means for triggering are digitally implemented by means of a programmable digital microprocessor.

14. The method and apparatus for adaptively superimposing bursts of digital data with existing analog sound signals as recited in claim 11, wherein said decoder for receiving said transmitted or recorded encoded signals comprise:
    an audio input connector coupled to a source of transmitted or recorded encoded signals;
    a three-way signal divider having an input connected to said audio input connector;
    a data output connector coupled to output of said text signal separator;

a text-to-video converter having an input connected to said text signal separator;
a baseband video connector having an input connected to said text-to-video converter;
a video monitor having an input connected to said baseband video connector;
a television modulator having an audio section whose input is coupled to the second output of said 3-way signal divider, a video section hose input is coupled to a second output of said text-to-video converter, an RF section and the corresponding standard local oscillator;
an RF output connector that is coupled to output of said television modulator;
a baseband audio output connector that is coupled to a third output of said 3-way signal divider;
a television receiver having an input connected to said RF output connector;
a peripheral sound amplifier having suitable transducers; and, a suitable housing;
a programmable integrated circuit digital microprocessor which is well known in the art which performs the equivalent functions of;
a bandpass filter having an input coupled to a first output of said signal divider;
a limiting audio amplifier having an input connected to output of said bandpass filter;
a frequency discriminator having an input connected to output of said limiting audio amplifier;
a text signal separator having an input connected to output of said frequency discriminator;
thereby allowing a digital implementation of the a decoder of a method and apparatus for adaptively superimposing bursts of digital data with existing analog sound signals.

* * * * *